Feb. 1, 1949.   S. S. JACOBS ET AL   2,460,293
REFORMING MACHINE
Filed Jan. 3, 1946   10 Sheets-Sheet 3
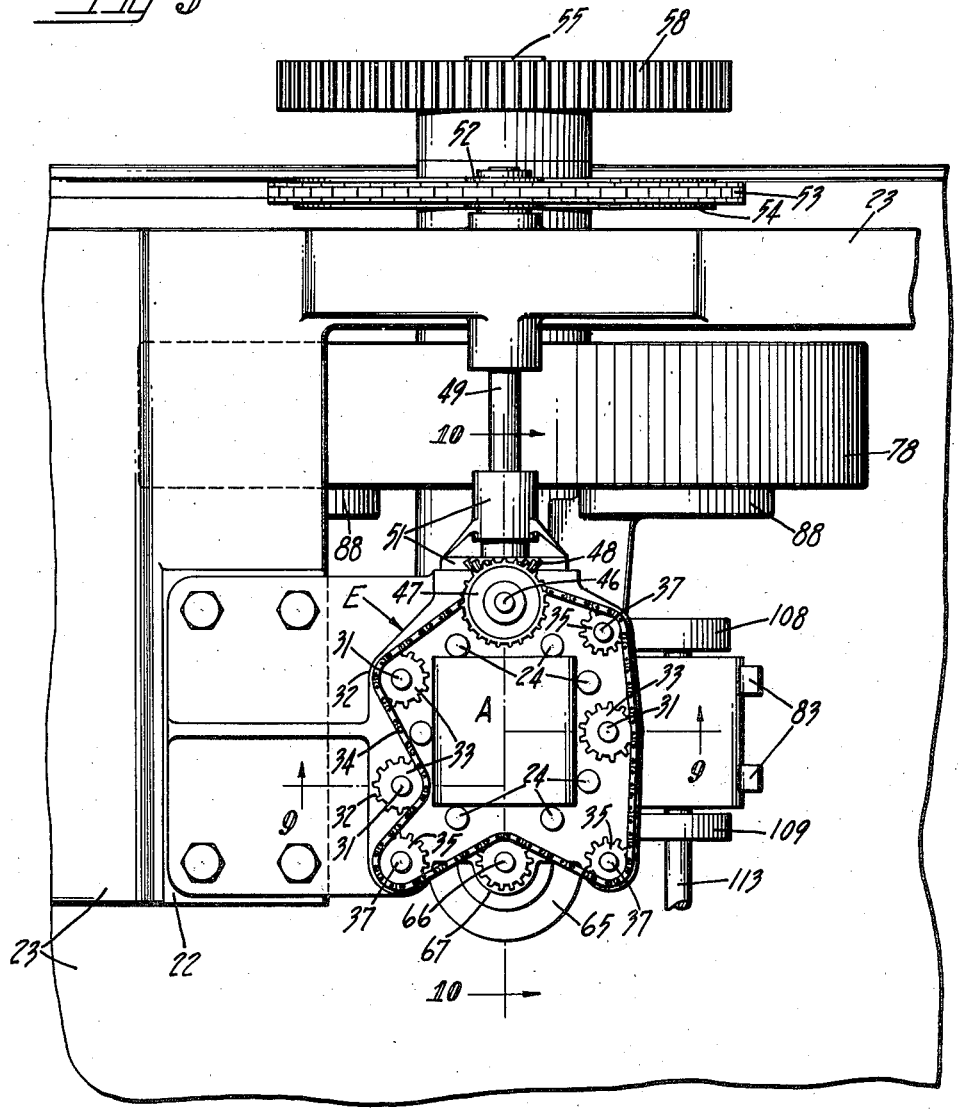
INVENTOR.
Samuel S. Jacobs
BY Howard B. Peterson
Ivan D. Thornburgh
Charles H. Erne
ATTORNEYS

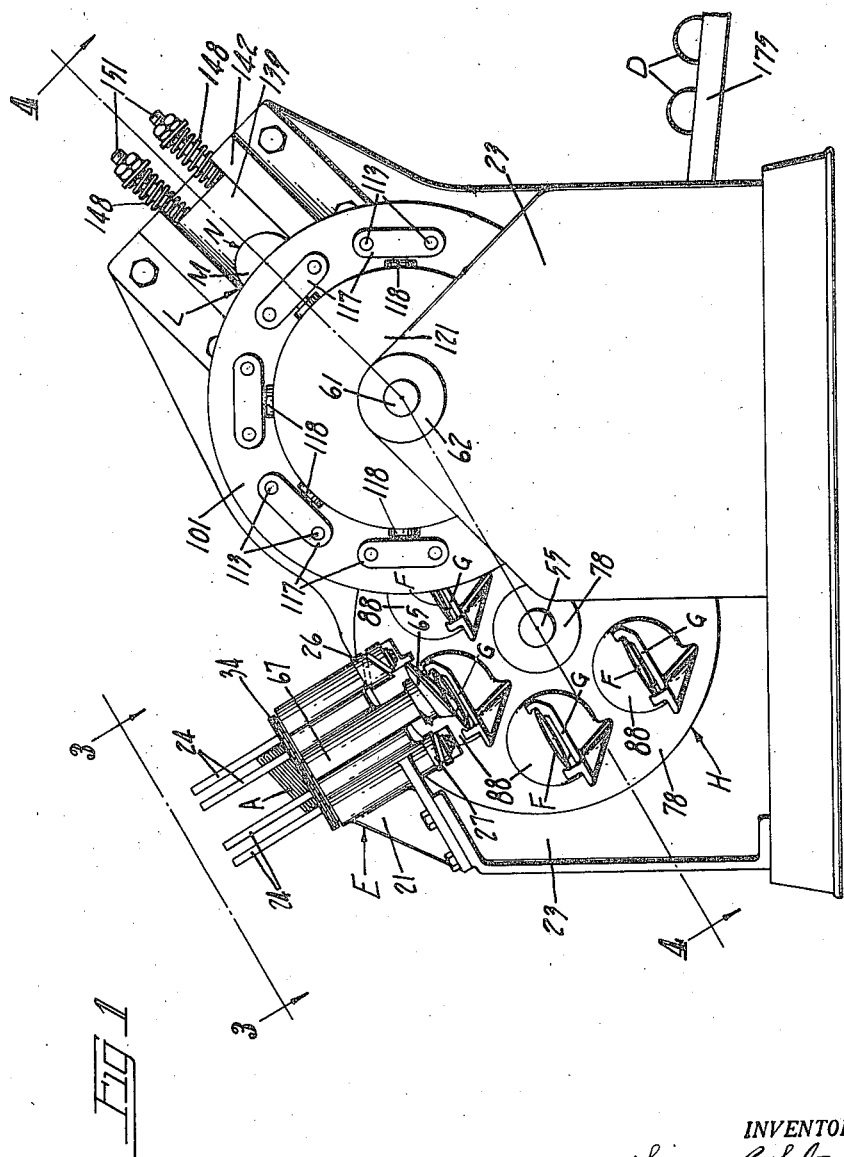

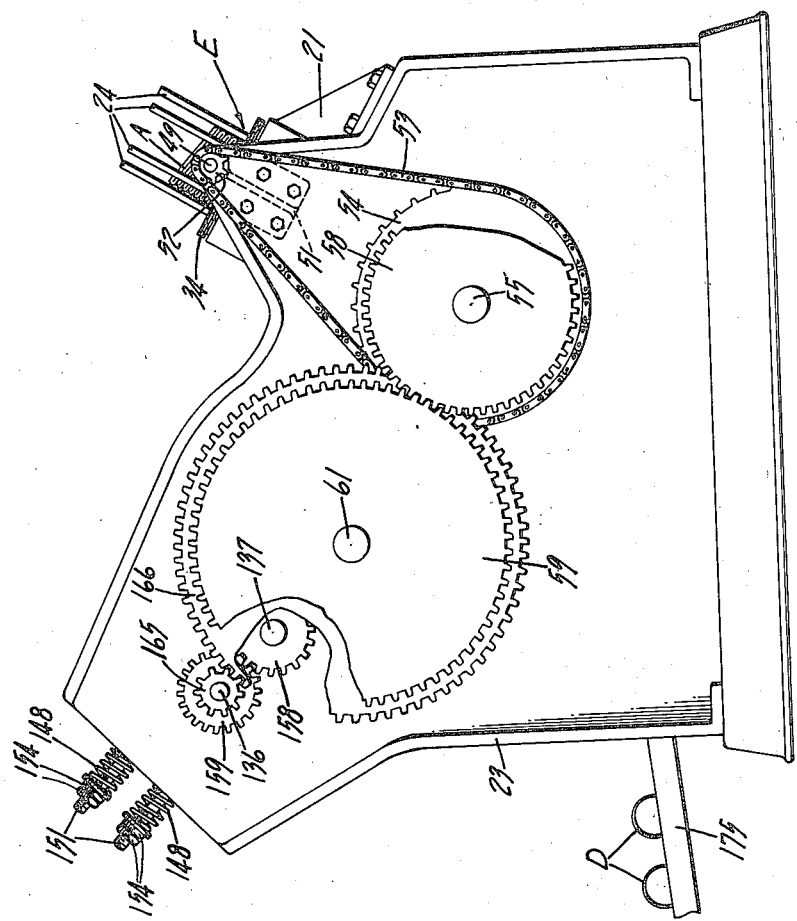

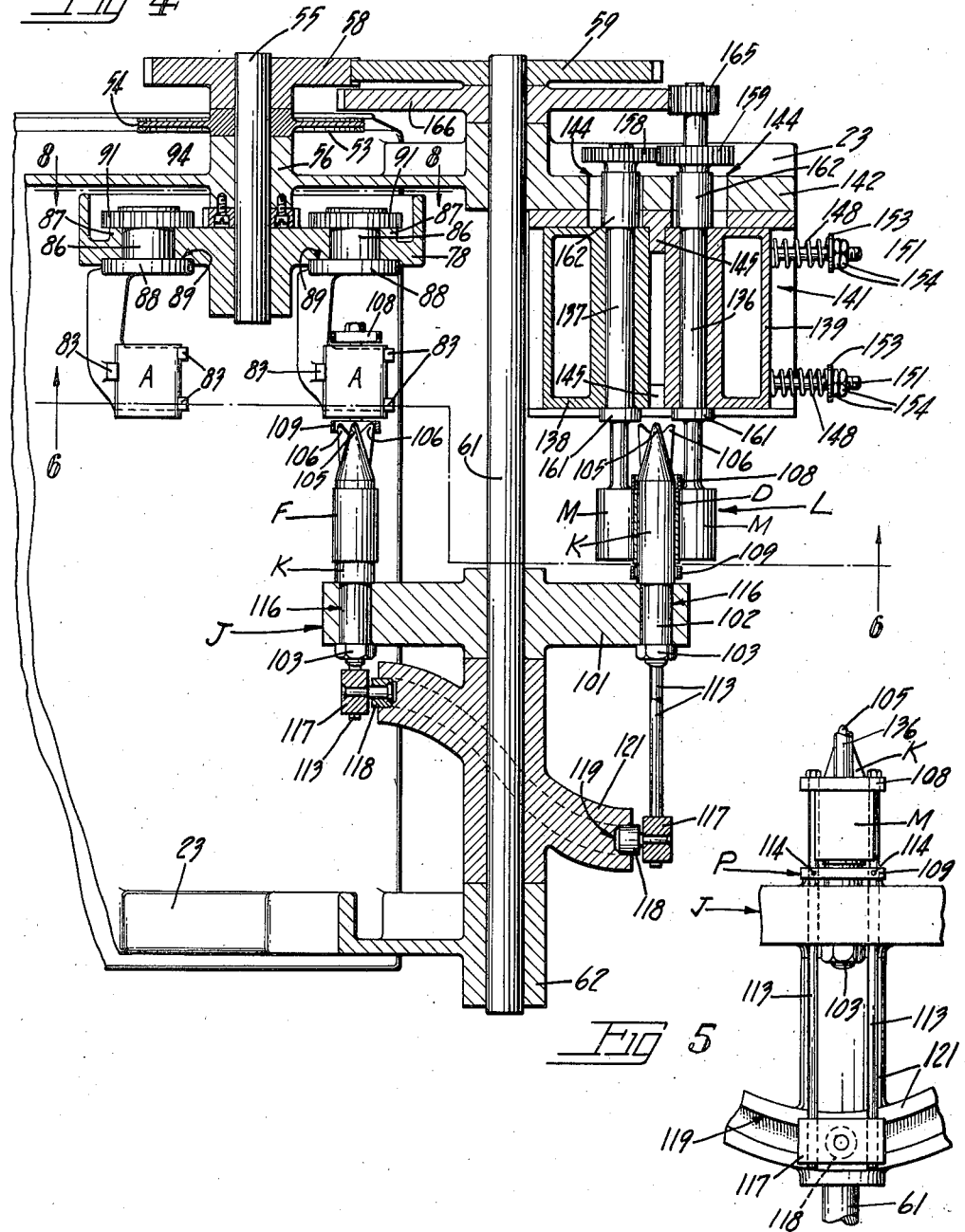

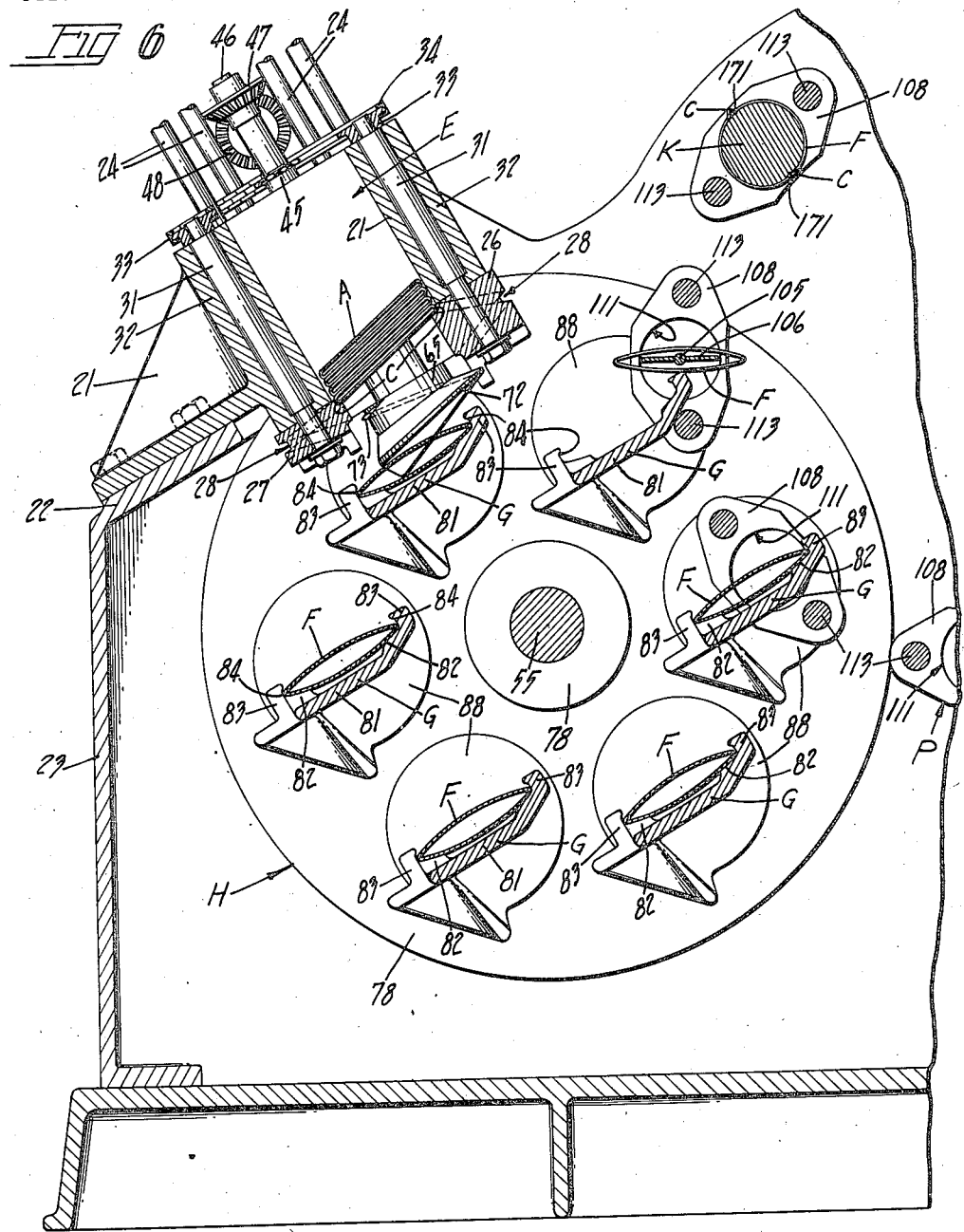

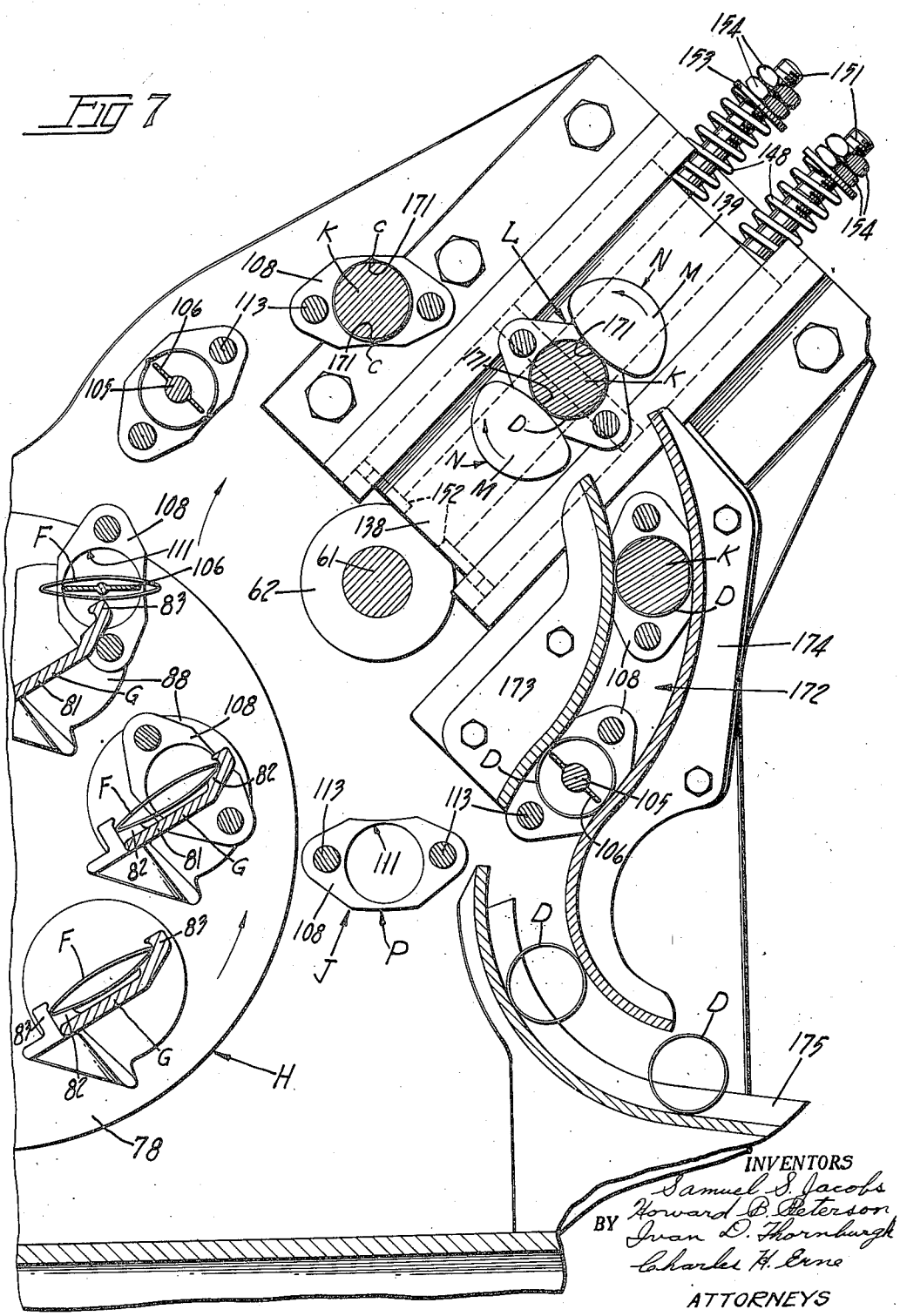

Feb. 1, 1949. S. S. JACOBS ET AL 2,460,293
REFORMING MACHINE

Filed Jan. 3, 1946 10 Sheets-Sheet 7

INVENTORS
Samuel S. Jacobs
BY Howard B. Peterson
Ivan L. Thornburgh
Charles H. Erne
ATTORNEYS

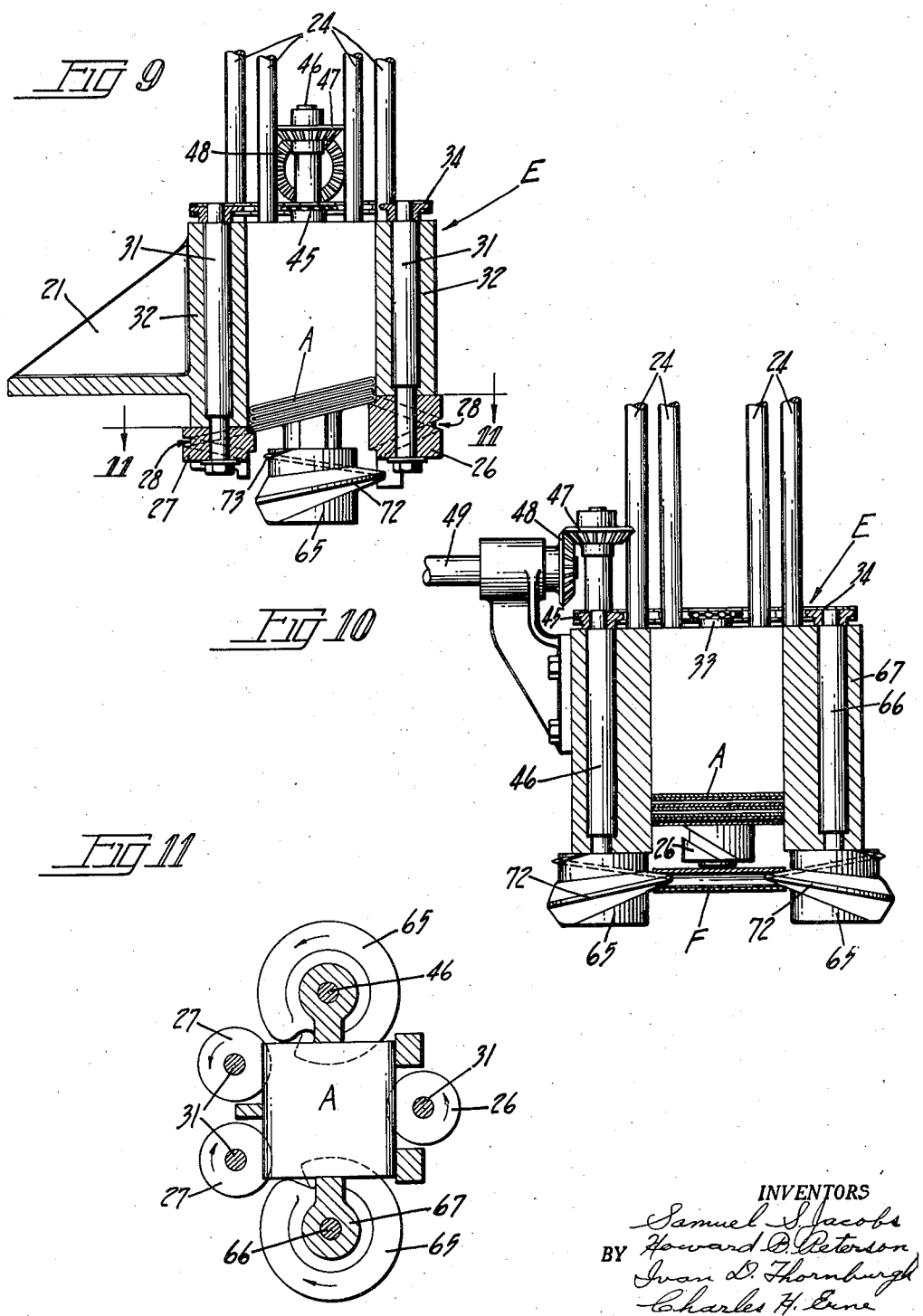

Feb. 1, 1949.  S. S. JACOBS ET AL  2,460,293
REFORMING MACHINE
Filed Jan. 3, 1946  10 Sheets-Sheet 9

INVENTORS
Samuel S. Jacobs
Howard B. Peterson
BY Ivan L. Thornburgh
Charles H. Eine
ATTORNEYS Feb. 1, 1949.  S. S. JACOBS ET AL  2,460,293
REFORMING MACHINE
Filed Jan. 3, 1946  10 Sheets-Sheet 10

Patented Feb. 1, 1949

2,460,293

UNITED STATES PATENT OFFICE 2,460,293

REFORMING MACHINE

Samuel S. Jacobs, San Mateo, and Howard B. Peterson, San Francisco, Calif., assignors to American Can Company, New York, N. Y., a corporation of New Jersey Application January 3, 1946, Serial No. 638,854

16 Claims. (Cl. 153—32)

The present invention relates to a can body reforming machine for initially opening and completely reforming can bodies provided with relatively flat side parts joined by sharply curved connecting areas called "eyes," and has particular reference to an improved high speed continuous motion machine for effecting all of the steps required to completely reform a can body in a minimum length of time.

Shipment and storage of empty sheet metal can bodies for use in making containers or cans for food products sometimes is facilitated by flattening or collapsing the bodies so that they occupy less space. When ready for use, the walls of the collapsed bodies are opened or spread apart and then the bodies are reformed by rolling or other means to restore them to their original or other desired cross sectional form.

The partial opening of a collapsed body usually leaves a pair of oppositely disposed corrugations, known in the can making industry as eyes, in the body wall where the wall has been sharply curved or bent during the collapsing operation. For best results in reforming a collapsed body these eyes must be entirely eliminated.

The instant invention contemplates the provision of a continuously operating machine for handling collapsed can bodies in such a manner that full control may be had over the position of the eyes while the can bodies are moving through the machine so that these eyes will be in the proper position relative to the working stations through which the bodies pass during the reforming operation.

An object of the invention is the provision of a can body reforming machine wherein the various operating parts are arranged for continuous motion so that collapsed can bodies to be reformed may pass through the machine at a high rate of speed and in a smooth and efficient manner.

Another object is the provision of such a machine wherein constant control is maintained over the moving can bodies to retain the eyes of the bodies in a predetermined position relative to the various working stations through which the bodies pass so that these eyes may be efficiently operated upon in connection with effecting the reforming of the bodies to a desired shape.

Another object is the provision in a machine of this character of rotatable handling devices for transferring can bodies to be reformed from station to station while maintaining the can bodies in a predetermined position so that control may be had over the relative position of the eyes in the bodies.

Numerous other objects and advantages of the invention will be apparent as it is better understood from the following description, which, taken in connection with the accompanying drawings, discloses a preferred embodiment thereof.

Referring to the drawings:

Figure 1 is a front elevation of a can body reforming machine embodying the instant invention;

Fig. 2 is a view similar to Fig. 1 showing the back of the machine;

Fig. 3 is an enlarged top plan view of a portion of the machine at the left in Fig. 1 and as viewed along a plane indicated by the line 3—3 in that figure, with parts broken away;

Fig. 4 is an enlarged sectional view taken substantially along the broken line 4—4 in Fig. 1, with parts broken away;

Fig. 5 is a side elevation of a portion of the mechanism at the right in Fig. 1, with parts broken away;

Figs. 6 and 7 are greatly enlarged sectional views which when taken together constitute a full sectional view taken substantially along the broken line 6—6 in Fig. 4, with parts broken away;

Figure 12:
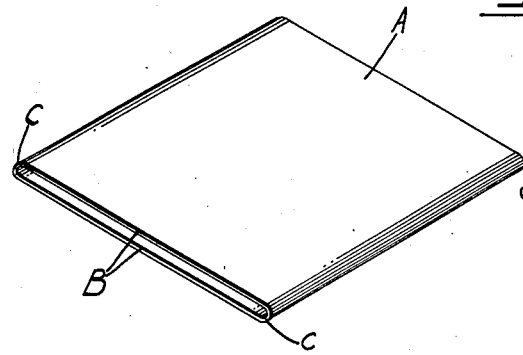
Figure 13:
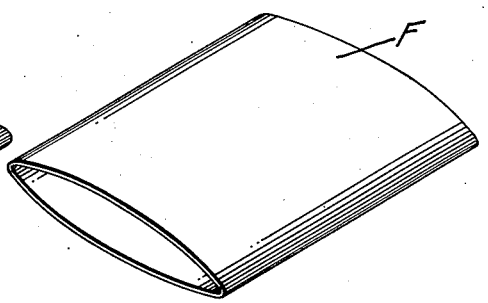
Figure 14:
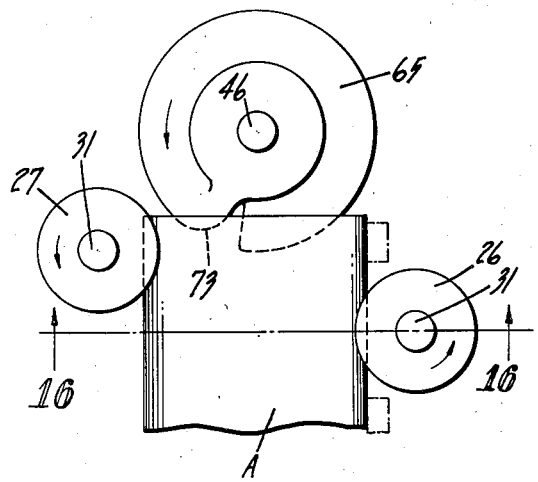
Figure 15:
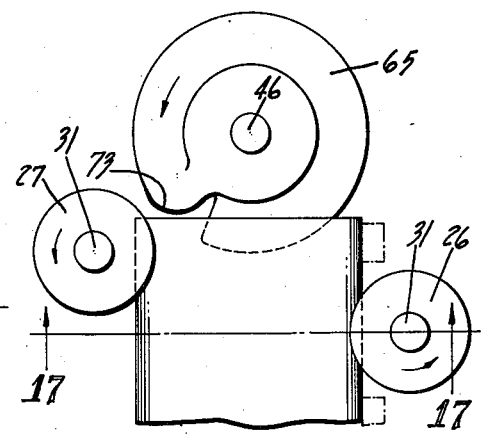
Figure 16:
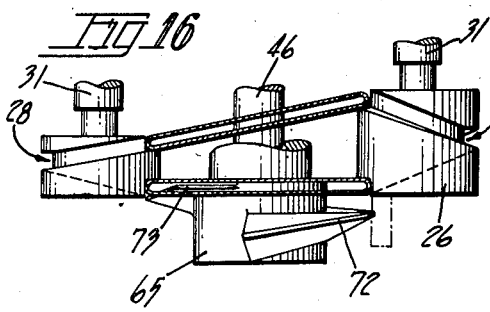
Figure 17:
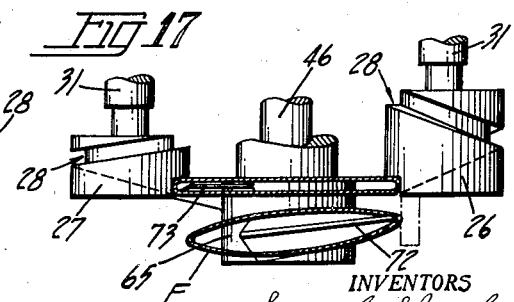
Figure 18:
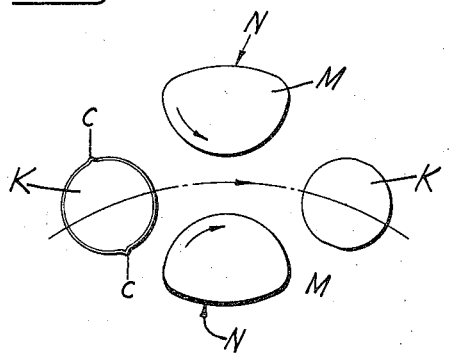
Figure 19:
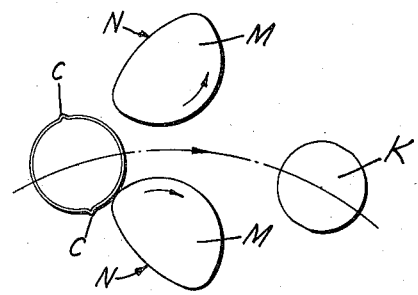
Figure 20:
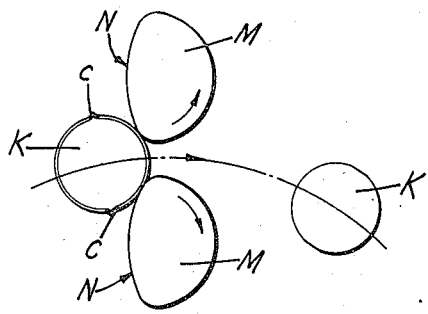
Figure 21:
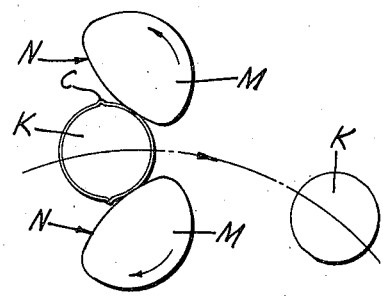
Figure 22:
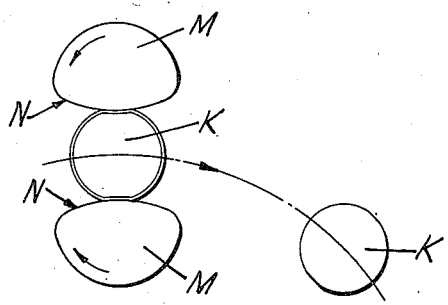
Figure 23:
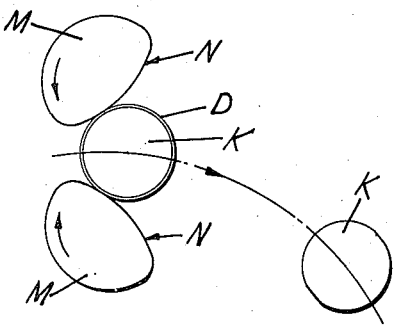

Figs. 9 and 10 are sectional views taken substantially along the lines 9—9 and 10—10 in Fig. 3, with parts broken away;

Fig. 11 is a horizontal section taken substantially along the broken line 11—11 in Fig. 9;

Figs. 12 and 13 are enlarged perspective views of a can body before and after being initially opened;

Figs. 14 and 15 are enlarged schematic views showing the relative position of a can body and the spreader worms during the opening of the body, with parts broken away;

Figs. 16 and 17 are sectional views taken substantially along the lines 16—16, 17—17 in Figs. 14 and 15, respectively, with parts broken away; and Figs. 18 to 23, inclusive, are diagrammatic views illustrating the action of the ironing elements of the device on the can bodies.

As a preferred embodiment of the instant invention the drawings illustrate a can body reforming machine in which collapsed sheet metal can bodies A (Fig. 12) having relatively flat side parts or walls B joined by sharply curved connecting eyes C are reformed into cylindrical sheet can bodies D (Figs. 7 and 23) for use in producing sheet metal cans for food and other products.

In the machine the collapsed can bodies A are fed individually from a stack of such bodies retained in a magazine E (Figs. 1 and 6) and are partially opened by a spreading action effected against the side walls of the bodies while keeping the bodies in continuous motion to produce partially opened can bodies F (see also Fig. 13). These partially opened bodies are deposited in cradles G (Figs. 1, 4 and 6) of a rotatable continuous motion transfer device H. The transfer device carries the cradles and the can bodies supported thereon through an arcuate path of travel while maintaining the can bodies in the predetermined relative position in which they were received so that control may be had over the relative location of the eyes of the bodies.

The transfer device H carries the partially opened can bodies F into position adjacent a rotatable continuous motion, carrier device J (Figs. 1, 4 and 7) which carries non-rotatable mandrels or supports K. These mandrels receive the can bodies F from the transfer device in a smooth continuous transfer motion which further spreads apart the side walls of the bodies and leaves the bodies on the mandrels in a position with the two eyes of each of the bodies in an aligned radial relation to the carrier device.

With the can bodies F in this position on the mandrels K the carrier device J carries them along an arcuate path of travel which extends through an ironing station L at which is located a pair of spaced and parallel continuously rotating ironing elements or rollers M having generated peripheral contours N. The mandrels pass between these ironing rollers and in so doing bring the radially aligned eyes C of the bodies into momentary or passing tangential engagement with the rollers.

During this passing engagement between the can bodies F and the rollers M the generated peripheral contours N of the rollers ride on or roll against the eye areas of the can bodies on the mandrels and thus with a combined ironing and wiping action, iron or press out the eyes beyond the elastic limit of the material of the body. This gives a permanent smooth surface set and springs out the side walls B of the bodies so that they return to their original rounded condition as before the bodies were collapsed. With the eyes of the bodies thus entirely eliminated the reforming of the bodies is complete and the reformed bodies are discharged from the machine to any suitable place of deposit.

Referring now to the details of construction of the machine it will be observed that the magazine E in which the stack of collapsed can bodies A is retained, is formed as a part of a magazine member 21 (Figs. 3, 6, 9 and 10) which is mounted in an angular position on a support pad 22 of a frame 23 which constitutes the main frame of the machine.

The top and bottom of the magazine member 21 are open for the passage of the can bodies through the magazine. Vertical guide bars 24 secured in the top of the member and arranged around the magazine opening guide incoming bodies into the magazine. The bodies may be placed or fed into the magazine in any suitable manner.

Individual feeding of a can body A from the magazine is effected through the bottom of the magazine. To facilitate this feeding, the bodies are disposed within the magazine at a slight angle to its base. The feeding is effected preferably by a plurality of rotatable feeding screws which are disposed adjacent the bottom opening of the magazine.

The feeding screws include a main feeding screw 26 (see also Fig. 11) which is disposed adjacent one side of the magazine 21 and a pair of auxiliary feeding screws 27 which are disposed adjacent the opposite side of the magazine. The three screws thus provide a three point suspension for the collapsed can bodies.

The feeding screws 26, 27 extend into the magazine 21 and are engageable by the eye parts C of the lowermost can body in the stack, this lowermost body supporting the entire stack. The outer periphery of the screws are formed with helical grooves 28 for separating individual can bodies from the stack and for feeding them out of the magazine as the screws rotate, as will be hereinafter explained.

The feeding screws 26, 27 are mounted on the lower ends of upright shafts 31 which are journaled in bearings 32 formed in the magazine member 21. The shafts extend up through the magazine member and project above its top surface. The upper ends of the shafts carry sprockets 33 (see also Fig. 3) which are rotated in unison and in the proper direction by an endless chain 34 which surrounds the magazine E. The chain 34 is maintained in a taut condition by idler sprockets 35 mounted on studs 37 secured in the top of the magazine member 21.

The chain 34 is driven by a drive sprocket 45 (Fig. 10) which is mounted on the upper end of a drive shaft 46 journaled in a bearing formed in the magazine member 21. The shaft is driven by a bevel gear 47 which is mounted on the shaft above the drive sprocket 45. The gear meshes with a similar gear 48 which is mounted on a horizontal shaft 49 (see also Fig. 3) journaled in a bearing bracket 51 bolted to a side of the magazine member. The horizontal shaft 49 also carries a sprocket 52 (see also Fig. 2) which is continuously rotated by a chain 53 driven by a main sprocket 54 carried on the outer end of a horizontal transfer shaft 55. The transfer shaft is journaled in a bearing 56 (Figs. 3 and 4) formed in the main frame 23.

The transfer shaft 55 is continuously rotated by a spur gear 58 (Figs. 2 and 4) which is mounted on the shaft adjacent the sprocket 54 and which meshes with a gear 59 mounted on a horizontally disposed main drive shaft 61 journaled in a bearing 62 formed in the main frame. The main drive shaft is continuously rotated in any suitable manner.

Through such a gear train and sprocket connection with the main shaft 61, the main feeding screw 26 and the two auxiliary feeding screws 27 are rotated in timed order to deliver can bodies individually from the bottom of the magazine while maintaining them in an inclined position. To facilitate this feeding action the two auxiliary feeding screws 27 are rotated in opposite directions as indicated by the arrows in Fig. 11. These opposing directions of travel tend to centralize the moving can body in the magazine.

Partial opening of the collapsed bodies A as hereinbefore mentioned is effected preferably by a pair of continuously operating spreader worms 65 (Figs. 9, 10 and 11) which are located adjacent and just below the feeding screws 26, 27. There is one of these worms adjacent each end of the collapsed can bodies A in the magazine.

One of the spreader worms 65 is mounted on the lower end of the sprocket drive shaft 46. The other worm on the opposite side of the magazine is mounted on the lower end of a similar shaft 66 which is journaled in a bearing 67 formed in the magazine member 21. The shaft 66 extends up through the magazine member and on its upper end carries a sprocket 68 which engages with and is driven by the sprocket chain 34. In this manner the spreader worms are rotated in unison and in time with the feeding screws 26, 27 so that transfer of the can bodies from the screws to the worms is effected smoothly and at the proper time.

Each spreader worm 65 is formed with a helical thread 72 having a wide lead. For round cans of approximately three inches in diameter, a lead of about one and one half inches is used on the thread. For cans of other sizes the lead of the thread is increased or decreased in about the same proportion.

The outside diameter of the thread is constant. The thread extends once around the worm and starts with a thin fin-like lobe 73 (see Figs. 14 and 16) having a rounded or curved edge 74. From the lobe 73 and extending back along the thread, the thread at its root thickens progressively until the terminal end of the thread is slightly thicker than the distance the walls of the flattened can body A are to be spread apart. These threads on the two worms extend in opposite directions and the worms are rotated in opposite directions (toward each other) as shown by the arrows in Fig. 11.

Hence as the feeding screws 26, 27 feed a can body A down into the region of the spreader worms 65, the lobes 73 of the worms enter into the ends of the body close to the adjacent eyes C along one side of the body and as the worms rotate, the threads gradually and progressively spread apart the side walls of the body to a predetermined amount beyond the elastic limit of their original flat condition. It is this spreading action that partially opens the can body as hereinbefore mentioned.

The spreader worms 65 deliver the partially opened can bodies F to the transfer cradles G (Fig. 6) of the transfer device H. There are a plurality of the cradles G and they are rotatably mounted in a vertically disposed transfer turret 78 (see also Figs. 1, 3 and 4) carried on and continuously rotating with the inner end of the transfer shaft 55. The cradles are arranged in spaced relation in a circle concentric with the transfer shaft.

Each cradle G includes a relatively flat support base 81 having three raised support bosses or pads 82 disposed adjacent three sides of the top of the base for supporting a partially opened can body F in a three point suspension. Such a three point seat for the body compensates for any irregularities in the body such as warped or twisted side walls. Three gripper fingers 83 are provided on each cradle to hold a received can body in place. Two of these fingers are disposed along one side of the support base while the third finger is disposed along an opposing side of the base.

When a partially opened can body F is delivered by the spreader worm 65 to a cradle G, the threads of the worms place the body on the support bosses 82 and push the body down between the gripper fingers 83 with the side edge portions adjacent the eyes C in engagement with the fingers. Notches 84 (Fig. 6) are provided in the fingers for retaining the bodies in place. This leaves the opened ends of the body free and unobstructed for further use, as will be hereinafter explained.

Figure 8:
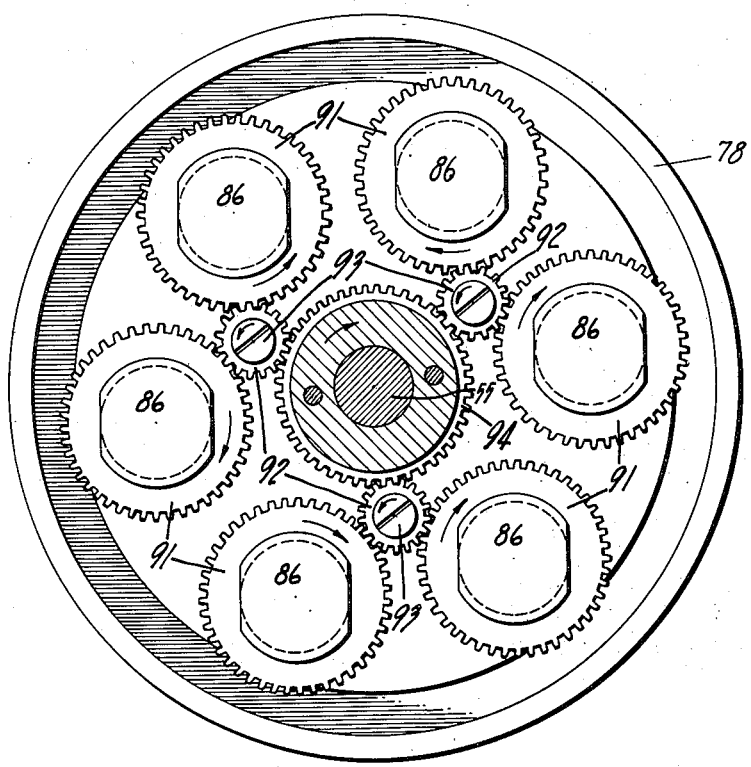
Fig. 8 is a greatly enlarged sectional view taken substantially along the line 8—8 in Fig. 4.

Each of the support bases 81 of the cradles G is formed at one end with a trunnion 86 (Fig. 4) which is journaled in a bearing 87 formed in the transfer turret 78. Adjacent the inner end of the trunnions, the support bases are formed with retaining collars 88 which are disposed in shallow recesses 89 formed in the inner face of the turret. The trunnions on their outer ends carry spur gears 91 (see also Fig. 8) and these gears mesh with small planetary gears 92 mounted on short studs 93 threadedly secured in the transfer turret. The drawings show six cradles G and six gears 91. There are three planetary gears 92 located one each between and meshing with two of the gears 91. The planetary gears surround and mesh with a stationary driving gear 94 which is secured to the inner end of the transfer shaft bearing 56 in the main frame 23.

Hence as the transfer turret 78 rotates, it carries the cradles G and the gears 91, 92 around the stationary gear 94. This travel of the planetary gears 92 around the stationary gear rotates the former and they in turn rotate the gears 91 and the cradles. The dimensional proportions of these gears is such as to provide a speed of rotation for the cradles relative to the transfer turret, which will maintain the cradles in a constant position against turning relative to each other throughout the rotation of the turret.

Thus the flat support bases 81 of the moving cradles G always remain parallel and at the same angle of inclination as when receiving the cam bodies F from the spreader worms 65. In this manner the can bodies while being carried through an arcuate path of travel by the rotation of the transfer turret are maintained in a predetermined constant position with constant control over the relative location of the eyes C of the bodies so that they will be in a predetermined radial alignment with the carrier device J for transfer to the mandrels K of that device as hereinbefore mentioned.

The carrier device J (Figs. 1, 4 and 7) includes a rotatable carrier disc 101 which is mounted in a vertical position on the continuously rotating main drive shaft 61. The carrier disc is disposed at one side of the transfer turret 78 in spaced and overlapping relation thereto and carries a plurality of the mandrels K arranged in a circle concentric with the main drive shaft and projecting inwardly and horizontally from the carrier disc. The paths of travel of the centers of the mandrels and the cradles G are thus in tangential relation.

The outer end of each mandrel K is formed with a shank 102 (Fig. 4) of smaller diameter than the mandrel and this shank extends through the carrier disk 101 and is locked in place by a nut 103. The mandrels are thus secured in a stationary or non-rotating position relative to the carrier disc.

The inner end of each mandrel is formed with a conical tip 105 having a pair of thin flat fish tail fins or entry guides 106. These entry fins are disposed one on each side of the conical tip of the mandrel and they are arranged in a single plane extending radially of the carrier disc 101.

The carrier disc 101 rotates in time with the transfer turret 78 and hence brings each mandrel individually and momentarily into horizontal alignment with a corresponding cradle G on the transfer turret. During this momentary or passing alignment the can body F on the aligned cradle G is pushed endwise out of the cradle and is impaled on the mandrel.

For the purpose of transferring a can body F from a cradle G to a mandrel K each mandrel is provided with a body shifting device or stripper P (Figs. 4, 5 and 7) which includes a feed plate 108 and a stripper plate 109. These plates loosely surround the adjacent mandrel and are formed with clearance holes 111. The feed plate 108 is secured by bolts 112 to the inner ends of a pair of spaced and parallel slide rods 113 which are disposed adjacent to and parallel with the mandrel. The stripper plate 109 is also carried on the rods in spaced relation to the feed plate so as to accommodate a can body F between them. The stripper plate is held in place on the rods by pins or set screws 114.

The slide rods 113 for each mandrel K are slidably disposed in bores 116 formed in the carrier disc adjacent the shank 102 of the mandrel. The outer ends of the rods extend beyond the disc and are secured in a tie block 117. This tie block carries a cam roller 118 which operates in a cam groove 119 of a stationary barrel cam 121 which surrounds the main drive shaft 61 and which is secured to the main frame 23.

Hence as a mandrel K comes into passing alignment with a cradle G as hereinbefore mentioned the moving cradle swings into position between the feed plate 108 and the stripper plate 109 of the stripper device P associated with the mandrel so as to position the partially opened can body F carried thereon, between these plates (see Figs. 4 and 6). A clearance opening 125 is provided in the cradles G for this purpose. This action is immediately followed by an outward movement of the slide rods 113 as effected by the continued rotation of the carrier disc 101 and the traversing by the cam roller 118 of the cam groove 119 of the stationary cam 121.

This outward movement of the slide rods 113 brings the feed plate 108 into engagement with the end of the can body F on the cradle G and thus shifts the can body off the cradle and onto the mandrel as hereinbefore mentioned. It should be observed that at this point in the travel of the cradle and the mandrel, the fish tail entry guides 106 of the mandrel and the eyes C of the body on the cradle are in register and hence as soon as the body begins its endwise movement it immediately telescopes over the fish tail guides and the conical tip of the mandrel. In this manner the eyes C of the body are immediately located on the mandrel in a radial position relative to the carrier disc 101. The fish tail guides also serve to lift the body off the cradle as the cradle and the mandrel pass out of register and move along their respective paths of travel.

Shifting of the body onto and along the mandrel continues after the mandrel moves out of register with the cradle and until the body is fully positioned on the mandrel proper. In this manner each partially opened can body F carried on a cradle G is impaled onto a corresponding mandrel K as the cradle and the mandrel come into register. This impaling of the can bodies onto the mandrels expands their side walls, as shown in the drawings (see Fig. 7). Such an operation also locates the eyes C of a can body in definite relation to its mandrel for completion of its reformation, as will now be described.

Reforming of the eyes C of a can body impaled on a mandrel K of the carrier device J is effected at the ironing station L (Figs. 4 and 7) through which pass the curved path of travel of the mandrels. At this station the two ironing elements or rollers M having generated contours N are located one on each side of the path of travel of the mandrel and the two rollers are centered along a radial line extending through the center of the carrier disc 101. Broadly speaking one roller is above the moving mandrel and one below the mandrel.

The ironing rollers M are formed on the inner ends of a pair of spaced and parallel actuating shafts 136, 137 which are journaled separately in bearings formed in lower and upper slide blocks 138, 139 respectively. These slide blocks are carried in a radial slideway 141 formed in an inclined slide housing 142 bolted to the main frame 23. The outer ends of the shafts extend through clearance slots 144 formed in the back of the slide housing and in the main frame.

The slide blocks 138, 139 are maintained in separated position and are confined to their respective portions of the slide housing 142 by stop lugs 145 (Fig. 4) which are formed on the housing and which project inwardly from the slideway 141. These stop lugs align with the curved path of travel of the mandrels K through the ironing station and thereby centralize the ironing rollers relative to such a path.

The two slide blocks 138, 139 are maintained under spring pressure against movement relative to each other, by a plurality of compression springs 148 which are carried on top of the upper slide block 139 and which distribute the pressure equally between two blocks. There are four of these springs and they surround the upper ends of long bolts 151 (Fig. 7) which extend down through the two slide blocks and which yieldably tie the blocks together. The lower ends of the bolts are formed with heads 152 which are anchored in the lower slide block 138. The upper ends of the bolts are fitted with washers 153 and with nuts 154. This provides adjustment of the spring pressure and holds the springs in place.

The ironing rollers M are rotated in unison and in time with the carrier disc 101 by a pair of meshing spur gears 158, 159 (Figs. 2 and 4) which are mounted on the respective actuating shafts 136, 137. Stop collars 161 formed on the shafts intermediate their lengths and spacer sleeves 162 surrounding the outer ends of the shafts adjacent the gears 158, 159 confine the shafts against endwise movement in their bearings during this rotation.

The gears 158, 159 are rotated by a pinion 165 which is mounted on the upper actuating shaft 136. This pinion meshes with and is driven by a large driving gear 166 which is carried on the main drive shaft 61. The relation between the pinion and the driving gear is such that the pinion makes one complete revolution each time the driving gear rotates through a distance equal to the distance between the mandrels K on the carrier disc 101. This relation brings about a full turn or one revolution of the ironing rollers M for each mandrel K as the latter passes between the rollers at the ironing station. The rollers rotate in opposite directions or toward each other. This insures that their inner spaced faces move in the same direction as the mandrels moving along their circular path of travel. This is shown by indicating arrows in Fig. 7.

Hence as a mandrel K carries an impaled can body between the rotating ironing rollers M at the ironing station L, the rollers come into pressing engagement with the body at the areas which include the eyes C. This engagement is only momentary but is sufficient to roll out the eyes with a combined ironing and wiping action. The two eyes engage the two rollers almost simultaneously and thereby prevent any turning of the body on its mandrel. The generated contours of the outer peripheries of the two rollers are proportioned to progressively roll on the moving body to bring about this progressive, ironing action. This movement of the body and the rollers is graphically illustrated in Figs. 17 to 22, inclusive.

During this rolling action of the ironing rollers M against the eyes C of the can body as it passes between the rollers, the body on its mandrel K forces the rollers apart slightly against the resistance of the compression springs 148 acting on the slide blocks 138, 139, the effect of the springs completely equalizing the pressure on the two sides of the mandrel. This prevents any offsetting strain on the mandrel during the ironing operation and thereby the parallelism of the rollers and the mandrel is not disturbed. This operating action increases the pressure of the rollers against the eyes at just the proper time and place to facilitate elimination of the eyes. This movement of the rollers, however, is of such a small amount that there is no unmeshing effect on the roller actuating gears 158, 159 nor is there any interference between the pinion 165 and the main driving gear 166.

With such a generating rolling action between the can body, backed up by its mandrel, and the ironing rollers M backed up by springs, the eyes C of the body are rolled out flat and are entirely eliminated. To assist in this the mandrels K are provided with oppositely disposed flats 171 which are located in the proper places to be effective on the eyes of the body, as best shown in Figs. 6 and 7. This springs the side walls of the body outwardly into their original rounded condition and completes the reforming of the body into the cross sectional shape shown in Fig. 7.

In its fully reformed condition the body is slightly larger in diametere than the mandrel K on which it is supported. Hence the finished body may be readily stripped off the mandrel. This removal of the body is effected by the stripper plates 109 which surround the mandrels and which are actuated by the rods 113 and the stationary cam 121 hereinbefore mentioned.

Stripping of the reformed bodies from the mandrels K begins as soon as a body and its mandrel pass the reforming station L. The rotating carrier disc 101 carries the mandrel and the can body into an arcuate runway 172 (Fig. 7) which is set off between a pair of curved guide rails 173, 174 bolted to the side of the main frame 23. While the reformed can body is carried through this curved runway, the cam roller 118 traversing the cam groove 119 in the stationary cam 121 shifts the rods 113 and the stripper plate 109 associated with this mandrel, inwardly and thus pushes the can body endwise off the mandrel. The can body thus freed of all support, falls into a curved chute 175 bolted to the main frame and rolls along the chute to a suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for reforming can bodies provided with relatively flat side parts joined by sharply curved connecting eyes, the combination of spreader devices for partially separating the side parts of a can body to initially open the body, rotatable transfer means for receiving an opened can body and for carrying it along a curved path of travel, a mandrel movable into position adjacent said transfer means, a body shifting device for transferring the initially opened body onto said mandrel, ironing elements engageable with the can body on said mandrel, and means for producing relative movement between the said mandrel and said ironing elements for ironing out the eyes of the body to reform the body to a desired shape.

2. In a machine for reforming can bodies provided with relatively flat side parts joined by sharply curved connecting eyes, the combination of spreader devices for partially separating the side parts of a can body to initially open the body, a rotatable transfer turret disposed adjacent said spreader devices, means on said turret for receiving an opened can body from said spreader devices and for holding it in predetermined position during the rotation of said turret, a mandrel movable into position adjacent said transfer means, a body shifting device for transferring the initially opened body onto said mandrel, ironing elements engageable with the can body on said mandrel, and means for producing relative movement between said mandrel and said ironing elements for ironing out the eyes of the body to reform the body to a desired shape.

3. In a machine for reforming can bodies provided with relatively flat side parts joined by sharply curved connecting eyes, the combination of spreader devices for partially separating the side parts of a can body to initially open the body, a rotatable transfer turret disposed adjacent said spreader devices, gripper elements carried on said turret and movable relative to the turret during its rotation for receiving an opened can body from said spreader devices and for holding the body in the relative position in which it was received, a mandrel movable into position adjacent said transfer means, a body shifting device for transferring the initially opened body onto said mandrel, ironing elements engageable with the can body on said mandrel, and means for providing relative movement between said mandrel and said ironing elements for ironing out the eyes of the body to reform the body to a desired shape.

4. In a machine for reforming can bodies provided with relatively flat side parts joined by sharply curved connecting eyes, the combination of spreader devices for partially separating the side parts of a can body to initially open the body, a rotatable transfer turret disposed adjacent said spreader devices, a revolvable body cradle mounted on said turret and movable relative to the turret during its rotation for receiving an opened can body from said spreader devices and for maintaining the body in the relative position in which it was received, gripper fingers on said cradle for holding the body in place on the holder, a mandrel movable into position adjacent said transfer means, a body shifting device for transferring the initially opened body onto said mandrel, ironing elements engageable with the can body on said mandrel, and means for producing relative movement between said mandrel and said ironing elements for ironing out the eyes of the body to reform the body to a desired shape.

5. In a machine for reforming can bodies provided with relatively flat side parts joined by sharply curved connecting eyes, the combination of spreader devices for partially separating the side parts of a can body to initially open the body, a rotatable transfer turret disposed adjacent said spreader devices, a revolvable cradle mounted on said turret and movable relative to the turret during its rotation for receiving an opened can body from said spreader devices and for maintaining the body in the relative position in which it was received, gripper fingers on said cradle for holding the body in place on the holder, support pads on said holder and arranged for a three point support for the body held by said gripper finger, a mandrel movable into position adjacent said transfer means, a body shifting device for transferring the initially opened body onto said mandrel, ironing elements engageable with the can body on said mandrel, and means for producing relative movement between said mandrel and said ironing elements for ironing out the eyes of the body to reform the body to a desired shape.

6. In a machine for reforming can bodies provided with relatively flat side parts joined by sharply curved connecting eyes, the combination of spreader devices for partially separating the side parts of a can body to initially open the body, a rotatable transfer turret disposed adjacent said spreader devices, a revolvable cradle mounted on said turret and movable relative to the turret during its rotation for receiving an opened can body from said spreader devices and for maintaining the body in the relative position in which it was received, means on said cradle for holding the received body in place thereon, a planetary gear train connected with said cradle for revolving the cradle in time with the rotation of said turret to maintain the cradle in a predetermined relative position as the turret rotates, a mandrel movable into position adjacent said transfer means, a body shifting device for transferring the initially opened body onto said mandrel, ironing elements engageable with the can body on said mandrel, and means for producing relative movement between said mandrel and said ironing elements for ironing out the eyes of the body to reform the body to a desired shape.

7. In a machine for reforming can bodies provided with relatively flat side parts joined by sharply curved connecting eyes, the combination of spreader devices for partially separating the side parts of a can body to initially open the body, a rotatable transfer turret disposed adjacent said spreader devices, a plurality of revolvable cradles mounted on said turret and movable relative to said turret during its rotation for receiving individual opened can bodies successively from said spreader devices and for holding them in the relative position in which they were received, means for revolving said cradles in unison and in time with the rotation of said turret to maintain the cradles in a predetermined relative position as the turret rotates, a mandrel movable into position adjacent said transfer means, a body shifting device for transferring the initially opened body onto said mandrel, ironing elements engageable with the can body on said mandrel, and means for producing relative movement between said mandrel and said ironing elements for ironing out the eyes of the body to reform the body to a desired shape.

8. In a machine for reforming can bodies provided with relatively flat side parts joined by sharply curved connecting eyes, the combination of spreader devices for partially separating the side parts of a can body to initially open the body, continuous motion rotatable transfer means for receiving an opened can body and for carrying it along a curved path of travel, a continuous motion mandrel movable into position adjacent said transfer means, devices for transferring the initially opened body onto said mandrel, ironing elements engageable with the can body on said mandrel, and means for producing relative movement between said mandrel and said ironing elements for ironing out the eyes of the body to reform the body to a desired shape.

9. In a machine for reforming can bodies provided with relatively flat side parts joined by sharply curved connecting eyes, the combination of spreader devices for partially separating the side parts of a can body to initially open the body, continuous motion rotatable transfer means for receiving an opened can body and for carrying it along a curved path of travel, a continuous motion mandrel movable into position adjacent said transfer means, devices for transferring the initially opened body onto said mandrel, continuous motion ironing elements engageable with the can body on said mandrel, and means for producing relative movement between said mandrel and said ironing elements for ironing out the eyes of the body to reform the body to a desired shape.

10. In a machine for reforming can bodies provided with relatively flat side parts joined by sharply curved connecting eyes, the combination of continuous motion spreader devices for partially separating the side parts of a can body to initially open the body, continuous motion rotatable transfer means for receiving an opened can body and for carrying it along a curved path of travel, a continuous motion mandrel movable into position adjacent said transfer means, devices for transferring the initially opened body onto said mandrel, ironing elements engageable with the can body on said mandrel, and means for producing relative movement between said mandrel and said ironing elements for ironing out the eyes of the body to reform the body to a desired shape.

11. In a machine for reforming collapsed can bodies provided with relatively flat side parts joined by sharply curved connecting eyes, the combination of a magazine for a plurality of collapsed can bodies in stacked formation, feeding means for feeding the can bodies individually from said magazine, a pair of oppositely disposed continuously rotatable spreader worms disposed adjacent said feeding means for receiving can bodies in succession therefrom, said worms being operable in the ends of said bodies for separating their flat side parts to initially open the bodies, a continuously rotatable transfer turret disposed adjacent said spreader worms, a plurality of revolvable cradles mounted on said turret, and movable relative to the turret during its rotation for receiving individual opened can bodies successively from said spreader worms and for holding them in the relative position in which they were received, means for revolving said cradles in unison and in time with the rotation of said turret to maintain the cradles in a predetermined relative position as the turret rotates, a continuous motion rotatable carrier disc disposed adjacent said transfer turret, a plurality of mandrels mounted on said turret and movable by said disc into position adjacent said turret, devices for transferring the initially opened can bodies onto said mandrel, ironing elements disposed adjacent the path of travel of said mandrels and engageable with the can bodies on said mandrels, and means for producing relative movement between said mandrel and said ironing elements for ironing out the eyes of the bodies to reform the bodies to a desired shape.

12. In a machine for reforming can bodies provided with relatively flat side parts joined by sharply curved connecting eyes, the combination of spreader devices for partially separating the side parts of a can body to initially open the body, a rotatable transfer turret for receiving an opened can body and for carrying it along a curved path of travel, a mandrel movable into position adjacent said transfer turret for receiving the initially opened body, means for transferring the can body from said transfer turret to said mandrel, ironing elements engageable with the can body on said mandrel, and means for producing relative movement between said mandrel and said ironing elements for ironing out the eyes of the body to reform the body to a desired shape.

13. In a machine for reforming can bodies provided with relatively flat side parts joined by sharply curved connecting eyes, the combination of spreader devices for partially separating the side parts of a can body to initially open the body, rotatable transfer means for receiving an opened can body and for carrying it along a curved path of travel, a mandrel adjacent said transfer means, means for transferring the initially opened body from said transfer means to said mandrel, a pair of oppositely disposed spaced apart ironing elements disposed adjacent said transfer means, and means for effecting continuous relative movement between said elements and said mandrel to carry the opened body on said mandrel along a path of travel extending between said elements for engagement of the eyes of the body with the elements to iron out the eyes and thereby reform the can body to a desired shape.

14. In a machine for reforming can bodies provided with relatively flat side parts joined by sharply curved connecting eyes, the combination of spreader devices for partially separating the side parts of a can body to initially open the body, rotatable transfer means for receiving an opened can body and for carrying it along a curved path of travel, a mandrel adjacent said transfer means, means for transferring the initially opened body onto said mandrel, a pair of oppositely disposed spaced apart and rotatable ironing elements disposed adjacent said transfer means, and means for effecting continuous relative movement between said elements and said mandrel to carry the said mandrel with its opened body along a path of travel extending between said elements for engagement of the eyes of the body with the elements to iron out the eyes and thereby reform the can body to a desired shape.

15. In a machine for reforming can bodies provided with relatively flat side parts joined by sharply curved connecting eyes, the combination of spreader devices for partially separating the side parts of a can body to initially open the body, rotatable transfer means for receiving an opened can body and for carrying it along a curved path of travel, a pair of oppositely disposed spaced apart and continuously rotatable ironing rollers having generated contours on their outer peripheries disposed adjacent said transfer means, a non-rotatable mandrel, means for moving said mandrel into position adjacent said transfer means and thereafter along a path of travel extending between said ironing rollers, means for transferring the initially opened body from said transfer means onto said mandrel, said mandrel moving means carrying said body toward and between said rollers for passing engagement of the eyes of the body with said elements to iron out the eyes and thereby reform the can body to a desired shape, and means for rotating said ironing rollers in time with the passage of said mandrel with the can body thereon to bring the generated contour of said rollers into effective engagement with the eyes of the body as the eyes pass between said rollers.

16. In a machine for reforming can bodies provided with relatively flat side parts joined by sharply curved connecting eyes, the combination of spreader devices for partially separating the side parts of a can body to initially open the body, rotatable transfer means for receiving an opened can body and for carrying it along a curved path of travel, a mandrel adjacent said transfer means, means for transferring the initially opened body onto said mandrel, a pair of oppositely disposed spaced apart ironing elements disposed adjacent said transfer means, means for effecting continuous relative movement between said elements and said mandrel so that said mandrel describes a path of travel extending between said elements for engagement of the eyes of the body with the elements to iron out the eyes and thereby reform the can body to a desired shape, and yieldable mountings for said ironing elements allowing movement of the elements in a direction away from each other during engagement between the eyes and the elements to exert a predetermined pressure against the eyes during the ironing out operation.

SAMUEL S. JACOBS.
HOWARD B. PETERSON.

REFERENCES CITED

The following references are of record in the file of this patent:

UNITED STATES PATENTS

| Number | Name | Date |
|---|---|---|
| 1,190,341 | Thornburgh | July 11, 1916 |
| 1,306,810 | Gray | June 17, 1919 |
| 1,962,166 | Yost | June 12, 1934 |